UNITED STATES PATENT OFFICE.

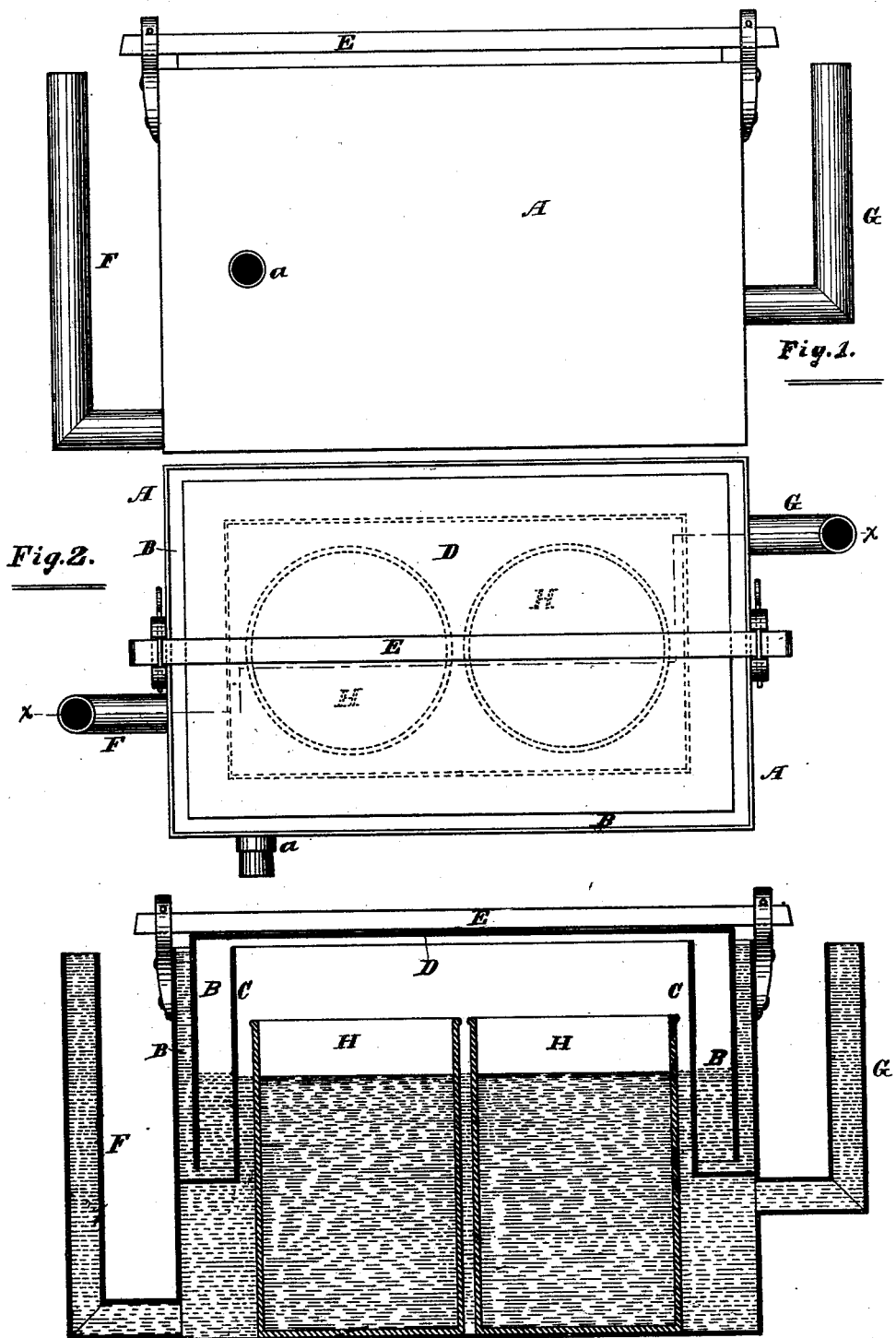

BENJAMIN F. HEWES, OF CRETE, ILLINOIS, ASSIGNOR TO ANNETTE J. HEWES, OF SAME PLACE.

MILK-COOLER.

SPECIFICATION forming part of Letters Patent No. 233,506, dated October 19, 1880.

Application filed May 17, 1880. (No model.)

*To all whom it may concern:*

Be it known that I, BENJAMIN F. HEWES, of Crete, in the county of Will and State of Illinois, have invented a certain new and useful Improvement in Milk-Coolers, of which the following is a specification.

The object I have in view is to produce a vat for holding open-top milk-cans, for the purpose of raising cream upon the milk contained in said cans, the construction of said vat being such that it can be closed air-tight, so as to prevent a change of air within the vat while the cream is being raised, a circulation of water can be maintained through the vat and around the milk-cans without admitting air, and a pressure greater than that of the atmosphere can be constantly exerted upon the surface of the milk, all by simple and efficient means, which are automatic in their operation.

My vat possesses the advantages of hastening the process of raising the cream and of producing a better quality of cream, and is capable of having the temperature of the milk easily and certainly regulated.

My invention consists in the peculiar means for maintaining an air-pressure upon the surface of the milk in the open-top cans, and, if desired, for permitting at the same time a circulation of the water through the vat and around the cans without changing the air in the vat; and, further, in the combination of the principal parts composing my vat, all as more fully hereinafter explained.

In the accompanying drawings, forming a part hereof, Figure 1 is a side view of the vat; Fig. 2, a top view of the same, and Fig. 3 a vertical section on line $x\,x$ of Fig. 2.

A is a rectangular tank, made of wood or metal, of sufficient depth to inclose a milk-can of the ordinary height used for setting milk, and large enough to contain a number of such cans. This vat has a reservoir, B, within its sides and ends, and extending about two-thirds ($\frac{2}{3}$) the depth of the vat. The inner walls, C, of the reservoir B form the mouth of the vat. A cover, D, is placed over the walls C and extends down into the reservoir B nearly or quite to the bottom of the same. This cover is removable, and is held in place by any suitable means, a removable cross-bar, E, being shown for that purpose. A pipe, $a$, is provided to draw off the water or oil that is placed in the reservoir B.

Two vertical pipes, F G, enter the ends of the vat, near diagonally-opposite corners thereof, below the reservoir B, and outside of such vat extend up to about the top of the same. The receiving-pipe F preferably enters the vat close to its bottom, while the overflow-pipe G opens out of the vat at a higher elevation, preferably close to the bottom of the reservoir B.

The open-top milk-cans H, containing the milk, are placed in the vat, the reservoir B is partly or wholly filled with water or oil, and the cover D is put in place and secured. The pipe F having been first connected with a suitable water-supply, the water is allowed to run into the vat and out of the discharge-pipe G, circulating around the pans in its passage through the vat. The backward pressure of the column of water in the discharge-pipe G causes the water in the vat to rise above the lower end of the discharge-pipe, and the inner column of water or oil in the reservoir B (that column which is within the cover D) to recede, until the column of water in the discharge-pipe is counterbalanced. By these means the vat is kept closed air-tight while the cream is being raised at the same time that an air-pressure greater than the atmospheric pressure is being constantly exerted upon the surface of the milk, and a circulation of water through the vat and around the milk-cans is being maintained. The air-pressure within the vat is caused by preventing the water from rising to the height of the overflow by reason of the confined body of air above such water. This pressure being greater than the atmospheric pressure on the outside of the cover D, such cover will be raised, as shown in Fig. 3, until it strikes the bar E.

If a circulation of the water in the vat is desired, the water in the supply-pipe should have sufficient head to force the water out of the overflow or discharge pipe. This could be accomplished by forcing the water into the supply-pipe with sufficient pressure, or by making the supply-pipe a little higher than the discharge-pipe and delivering the water into the upper end of the same with or without pressure.

When a simple air-pressure is desired without the circulation, the supply-pipe would be connected with a water-supply and be provided with a cock to shut off the water when it reaches the top of the overflow or discharge pipe, or the supply and discharge pipes would be about the same height and would not be connected with any other pipes. This last arrangement is shown in Fig. 3, wherein is illustrated the manner of obtaining the pressure from the water in a state of rest—hydrostatic pressure.

Ice may be placed in the vat around the cans, if desired, or the temperature can be wholly controlled by the flowing water.

The reservoir B may be placed outside of the walls of the vat, in which case the cover would be large enough to hang over the walls of the vat into this reservoir.

What I claim as my invention is—

1. An air-tight creaming-vat for containing open-top milk-cans, having an air-tight cover, and water-pipes entering the lower portion of the vat, such pipes being extended above their connection with the vat, substantially as and for the purpose set forth.

2. The combination, with the creaming-vat for containing open-top milk-cans, of the reservoir extending around the upper edge of such vat, the cover sitting in such reservoir, and the water receiving and discharging pipes entering the lower portion of the vat, the said discharge-pipe being extended above its connection with the vat, substantially as described and shown.

BENJAMIN F. HEWES.

Witnesses:
RUTH C. RICHARDS,
IDA S. ROBINSON.